United States Patent
Kwong et al.

(10) Patent No.: US 9,608,783 B2
(45) Date of Patent: Mar. 28, 2017

(54) METHODS AND DEVICES FOR ENABLING HIGH USER BITRATES IN MIXED-TRAFFIC SCENARIOS

(71) Applicant: Telefonaktiebolaget L M Ericsson (publ), Stockholm (SE)

(72) Inventors: Waikwok Kwong, Solna (SE); Billy Hogan, Sollentuna (SE); Patrik Karlsson, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 76 days.

(21) Appl. No.: 14/131,980

(22) PCT Filed: Dec. 2, 2013

(86) PCT No.: PCT/SE2013/051427
§ 371 (c)(1),
(2) Date: Jan. 10, 2014

(87) PCT Pub. No.: WO2014/088495
PCT Pub. Date: Jun. 12, 2014

(65) Prior Publication Data
US 2014/0307644 A1   Oct. 16, 2014

Related U.S. Application Data (60) Provisional application No. 61/732,728, filed on Dec. 3, 2012, provisional application No. 61/738,174, filed on Dec. 17, 2012.

(51) Int. Cl.
H04L 5/00   (2006.01)
H04W 24/10   (2009.01)
H04W 72/12   (2009.01)

(52) U.S. Cl.
CPC ............ *H04L 5/003* (2013.01); *H04L 5/0005* (2013.01); *H04L 5/0062* (2013.01); *H04W 24/10* (2013.01);
(Continued)

(58) Field of Classification Search
CPC ..... H04L 5/003; H04L 5/0005; H04L 5/0062; H04L 5/0094; H04L 5/0037;
(Continued)

(56) References Cited

U.S. PATENT DOCUMENTS

2008/0298299 A1*  12/2008  Thesling ................. 370/316
2010/0130219 A1*  5/2010  Cave et al. ................ 455/450
(Continued)

FOREIGN PATENT DOCUMENTS

WO   2009157836 A1   12/2009

OTHER PUBLICATIONS

Ericsson et al., "Further considerations on dedicated secondary carrier", 3GPP Draft; R2-131122, 3rd Generation Partnership Project (3GPP), Mobile Competence Centre, vol. RAN WG2, no. Chicago. USA; Apr. 15, 2013-Apr. 19, 2013, Apr. 6, 2013, 4 pages, XP050699426.
(Continued)

*Primary Examiner* — Obaidul Huq
(74) *Attorney, Agent, or Firm* — Rothwell, Figg, Ernst & Manbeck, P.C.

(57) ABSTRACT

The disclosure relates to a method performed by a communication device 3 for uplink transmission. The communication device 3 is configured with a primary carrier for uplink data transmission and a dedicated secondary carrier for uplink data transmission to a network node 5A, 5B, 7. The method comprises: transmitting 604 a scheduling information report using the primary carrier; receiving 608 a grant to use the dedicated secondary carrier; and transmitting 610
(Continued)

user data using a data channel on the dedicated secondary carrier upon reception of the grant for the dedicated secondary carrier, wherein the communication device 3 is configured such that it does not transmit any data on the dedicated secondary carrier unless receiving a grant for the dedicated secondary carrier. The disclosure also relates to corresponding method in network node, and to a communication device and network node.

29 Claims, 7 Drawing Sheets

(52) U.S. Cl.
CPC ....... *H04W 72/1268* (2013.01); *H04L 5/0037* (2013.01); *H04L 5/0087* (2013.01); *H04L 5/0094* (2013.01); *H04W 72/1205* (2013.01)

(58) Field of Classification Search
CPC H04L 5/0087; H04W 24/10; H04W 72/1268; H04W 72/1205
USPC ....... 370/310, 328, 329, 338, 340, 341, 345, 370/347, 348, 431, 437; 455/403, 422.1, 455/450
See application file for complete search history.

(56) References Cited

U.S. PATENT DOCUMENTS

| | | |
|---|---|---|
| 2010/0238882 A1 | 9/2010 | Zhang et al. |
| 2012/0314675 A1* | 12/2012 | Vujcic ........................... 370/329 |
| 2013/0028205 A1* | 1/2013 | Damnjanovic ......... H04L 5/001 370/329 |
| 2014/0098774 A1* | 4/2014 | Gao et al. ..................... 370/329 |

OTHER PUBLICATIONS

Ericsson et al., "Further EUL enhancements—dedicated secondary carrier", 3GPP Draft; R2-130249_FS_EDCH_ENH_Dedicated_secondary_Carrier, 3rd Generation Partnership Project, (3GPP), Mobile Competene Centre, vol. RAN WG2, no. St. Julian's, Malta; Jan. 28, 2013-Feb. 1, 2013, Jan. 19, 2013, 3 pages, XP050668302.
QUALCOMM Europe, "DC-HSUPA and CPC", 3GPP Draft; R1-091157_DC_HSUPA and CPC, 3rd Generation Partnership Project (3GPP), Mobile Competence. Centre, no. Seoul , South Korea, Mar. 18, 2009, Mar. 18, 2009, 6 pages, XP050338780.

* cited by examiner

METHODS AND DEVICES FOR ENABLING HIGH USER BITRATES IN MIXED-TRAFFIC SCENARIOS

CROSS-REFERENCE TO RELATED APPLICATIONS

This application is a 35 U.S.C. §371 National Phase Entry Application from PCT/SE2013/051427, filed Dec. 2, 2013, and designating the United States, which claims priority to: i) Provisional Application No. 61/732,728, filed Dec. 3, 2012 and ii) Provisional Application No. 61/738,174, filed Dec. 17, 2012. The above-mentioned applications are incorporated by reference herein.

TECHNICAL FIELD

The disclosure presented herein relates to the field of communication networks, and in particular to a communication device (e.g. a mobile communication device), a network node, and methods within a communication system.

BACKGROUND

In some networks based on 3GPP (Third Generation Partnership Project) (e.g., WCDMA (Wideband Code Division Multiple Access), a communication device (CD) receives and transmits data on only one carrier frequency (or "carrier" for short). Due to non-orthogonality between users, which results in interference leakage between the users, the uplink throughput is limited to 2-3 Mbps in scenarios with multiple users.

More in detail, in a WCDMA system as well as in a CDMA system, all users share the same uplink radio resources and can access the system at the same time. Each user is protected from others to a certain extent by using different scrambling codes. The protection is, however, not perfect. As mentioned, significant interference still leaks from one user to another due to the non-orthogonality between the users. New improvements in WCDMA, viz, high-speed packet access (HSPA) and HSPA+, have enabled very high single-user bitrates. The very-high bitrates introduce very high interference that makes it difficult for other users to co-exist in the same cell. For example, those that are farther away in the cell may not have sufficient uplink link budgets to overcome the high interference. This means, as concluded above, that in reality the high bitrates can rarely be used in real network and mixed traffic environments.

To enable high-bitrate operation in a real-network environment, the high-bitrate transmissions must be isolated from users that are vulnerable to the high interference created. A natural way to accomplish this within the current WCDMA technology is to make use of a "clean carrier" concept. In this concept, carriers are divided into regular carriers and clean carriers. The regular carriers provide the basic needs of a user. The clean carriers are dedicated exclusively to high-bitrate transmissions. On a clean carrier, users are scheduled by the network to transmit one at a time as much as possible in order to avoid interfering with one another.

One method of implementing a clean carrier system is to make use of the Inter-Frequency Handover (IFHO) procedure. Users are admitted on the regular carriers where user bitrates are limited to a certain maximum value. When there is a need for higher bitrates, the CD is reconfigured to a dedicated high-bitrate carrier using the IFHO procedure. When the need for high bitrates disappears, the CD is reconfigured back to a regular carrier.

Another method (see e.g. WO 2009/157836) is to make use of the 3GPP Rel-9 Multi-Carrier High Speed Uplink Packet Access (HSUPA) feature (also known as Dual Cell Enhanced Dedicated CHannel, E-DCH operation). A CD equipped with this capability can transmit simultaneously on two carriers: a primary carrier and a secondary carrier. The primary carrier would be configured on a regular carrier and the secondary on a dedicated high-bitrate carrier. When there is no high-bitrate need, the CD transmits data only on the primary carrier. When there is the need, the CD can be scheduled to transmit on the secondary carrier in addition to the primary carrier.

The methods described above have a number of drawbacks in terms of performance and network management complexity. For example, the IFHO method has a disadvantage in that it involves re-allocating system-internal resources in addition to radio resources and is rather expensive in terms of network processing load. Further, the IFHO procedure requires Radio Resource Control (RRC) signaling, which introduces significant delay on the order of hundreds of milliseconds. If the user requires only a few Transmission Time Intervals (TTIs) of high-bitrate transmissions, it seems hardly worth the effort to perform the procedure. In addition, the delays introduce large overheads if each dedicated high-bitrate carrier is to be used by one user at a time. Still further, to start low-rate services, e.g. speech, while a CD is transmitting on a dedicated high-bitrate carrier may require that the connection be reconfigured back to a regular carrier.

The multi-carrier HSUPA method provides improvements, but still has a disadvantage in the delay in activating and deactivating the secondary carrier: 3GPP mandates a 6 TTI (18 slot) delay after receiving the High-Speed Shared Control CHannel (HS-SCCH) order. This delay is very significant when users are to be scheduled one at a time for short durations of a few TTIs. For good performance, it is preferable to have the secondary carrier activated at all times. Overhead for activating the secondary carrier for standby purpose is a further disadvantage. For inactive users, there is a cost in terms of higher CD battery consumption. The UL (UpLink) Dedicated Physical Control Channel (DPCCH) is transmitted on the secondary carrier for maintaining synchronization and power control. The CD also needs to monitor the Down-Link (DL) control channels on the secondary carrier. For the network, the interference from the many DPCCH from inactive users consumes considerable capacity of the secondary carrier. Furthermore, the interference on the secondary carrier is quite severe since it is intended for high-bitrate operations. The DPCCH power must be sufficiently high in order to maintain a good enough signal-to-noise ratio. When it is a user's turn to transmit, the interference from other users disappears and the signal-to-noise ratio of the DPCCH can easily jump 10 fold. This means the data part is also transmitted at 10 times the necessary power since the DPCCH power is used as a reference for setting the power of the data channel. This increases the CD's power consumption and decreases the maximum bitrate, as the CD can easily become power limited. A still further disadvantage is maintaining mobility on the secondary carrier: The CD is required to perform intra-frequency measurement and reports intra-frequency events to the network, even if the secondary carrier is deactivated.

SUMMARY

An object of the present disclosure is to solve or at least alleviate at least one of the above mentioned drawbacks.

The present disclosure presents embodiments of method and arrangements to further improve the uplink transmission for communication devices (CDs) in a communication system.

The object is according to a first aspect achieved by a method performed by a communication device for uplink transmission is provided. The communication device is configured with a primary carrier for uplink data transmission and a dedicated secondary carrier for uplink data transmission to a network node. The method comprises: transmitting a scheduling information report using the primary carrier; receiving a grant to use the dedicated secondary carrier; and transmitting user data using a data channel on the dedicated secondary carrier upon reception of the grant for the dedicated secondary carrier, wherein the communication device is configured such that it does not transmit any data on the dedicated secondary carrier unless receiving a grant for the dedicated secondary carrier.

An efficient method is provided for enabling high-bitrate transmissions, in particular in a mixed traffic scenario. A dedicated (high-bitrate) secondary carrier is used that requires little or no overhead to the communication device.

The object is according to a second aspect achieved by a communication configured for uplink transmission. The communication device is configured with a primary carrier for uplink data transmission and a dedicated secondary carrier for uplink data transmission to a network node. The communication device is configured to: transmit a scheduling information report using the primary carrier; receive a grant to use the dedicated secondary carrier; and transmit user data using a data channel on the dedicated secondary carrier upon reception of the grant for the dedicated secondary carrier, the communication device further being configured such that it does not transmit any data on the dedicated secondary carrier unless receiving a grant for the dedicated secondary carrier.

The object is according to a third aspect achieved by a method performed by a network node of a network comprising a communication device. The method comprises: receiving a scheduling information report from the communication device on a primary carrier; determining, based on information included in the scheduling information report, whether to provide to the communication device a time-limited grant to use a dedicated secondary carrier, which is separate and distinct from the primary carrier; and transmitting, based on the determination, a time-limited grant to the communication device for transmitting data on the dedicated secondary carrier.

The object is according to a fourth aspect achieved by a network node of a network comprising a communication device. The network node is configured to: receive a scheduling information report from the communication device on a primary carrier; determine, based on information included in the scheduling information report, whether to provide to the communication device a time-limited grant to use a dedicated secondary carrier, which is separate and distinct from the primary carrier; and transmit, based on the determination, a time-limited grant to the communication device for transmitting data on the dedicated secondary carrier.

Further features and advantages of the present disclosure will become clear upon reading the following description and the accompanying drawings.

BRIEF DESCRIPTION OF DRAWINGS

The present disclosure will become more fully understood from the detailed description provided hereinafter and the accompanying drawings which are given by way of illustration only. In the different drawings, same reference numerals correspond to the same element.

ACRONYMS AND ABBREVIATIONS

3GPP Third Generation Partnership Project
CD Communication Device
CDM Code Division Multiplexing
CDMA Code Division Multiple Access
CPC Continuous Packet Connectivity
DCH Dedicated CHannel
DL Downlink
DPCCH Dedicated Physical Control Channel
E-AGCH Enhanced dedicated channel Absolute Grant Channel
E-DCH Enhanced Dedicated Channel
E-DPCCH Enhanced Dedicated Physical Control Channel
E-DPDCH Enhanced Dedicated Physical Data Channel
E-HICH E-DCH Hybrid ARQ Indicator Channel
FACH Forward Access CHannel
F-DPCH Fractional Dedicated Physical Channel
HARQ Hybrid Automatic Repeat Request
HDR High Data Rate
HSPA High-Speed Packet Access
HSPA+ Evolved HSPA
HS-DPCCH High Speed Dedicated Physical Control Channel
HS-SCCH HS-DSCH Shared Control Channel
HSUPA High-Speed Uplink Packet Access
IC Interference Cancellation
IFHO Inter-Frequency Handover
L1 Layer one
LDR Low Data Rate
MAC Medium Access Control
MC Multicarrier
NBAP Node B Application Part
PDU Protocol Data Unit
QoS Quality of Service
RDTR Requested Data Transmission Rate
RRC Radio Resource Control
SI Scheduling Information SIR Scheduling Information Report
TDM Time Division Multiplexing
UL Uplink
WCDMA Wideband Code Division Multiple Access

DETAILED DESCRIPTION

Briefly, this disclosure provides an efficient way for enabling high-bitrate transmissions in a mixed traffic scenario. For example, aspects of the disclosure provide:

- a dedicated high-bitrate secondary carrier that requires little or no overhead to the CD;
- realization of time-limited grants (TGs) for transmission on the secondary carrier; and
- a scheduling strategy for the dedicated high-bitrate carrier including new criteria for triggering the transmission of scheduling information reports (SIRs).

Some embodiments of this disclosure provide a lean version of the clean-carrier concept based on Multi-Carrier HSUPA. In some embodiments, a primary carrier is used in a conventional manner (for example, to carry control and data channels that enable a CD to establish connectivity and send/receive user plane data) and a dedicated secondary carrier is used for high-bitrate transmissions, in particular clean operation of high-bitrate transmissions. In some embodiments, the CD may be configured with a dedicated secondary carrier regardless of the state of the CD. For example, the CD may utilize the secondary carrier when the CD is in the CELL_FACH state or the CELL_DCH state.

1. Primary Carrier

Each CD connected to the network is configured with a primary carrier for UL data transmission. In some embodiments, the primary carrier is a regular carrier and serves three different purposes: (1) allow the CD to maintain its connection with the network—this includes keeping synchronization and maintaining quality of the radio link through fast power control; (2) to enable the CD to communicate with the network using the RRC protocol, which may be carried on a Signaling Radio Bearer (SRB) (the SRB is usually configured as non-scheduled transmission); and (3) to carry services, which include the transmission of scheduled and non-scheduled data.

Depending on need and network policy, the CD may be given a grant to transmit scheduled data up to a certain bitrate. Optionally, the primary carrier can also be used for carrying speech calls and other circuit-switched services.

2. Dedicated Secondary Carriers

To enable high-bitrate transmissions, the CD may also be configured with a dedicated secondary carrier (i.e. at least one secondary carrier) at the same time when the primary carrier is configured. In some embodiments, in contrast to the primary carrier, the dedicated secondary carrier is used only for data services and not for maintaining connection or communication with the network. The dedicated secondary carrier may be a dedicated high-bitrate (DHBR) carrier.

Unlike the 3GPP Rel-9 MC HSUPA secondary carrier, the dedicated secondary carrier here is always on, but at very little extra cost to the CD in terms of battery consumption. That is, the dedicated secondary carrier is always activated. For example, no activation or deactivation of the dedicated secondary carrier is required. When the CD is idling, i.e. no on-going data transmission on the primary carrier, it does not transmit the UL Physical Control Channel DPCCH on the dedicated secondary carrier. Nor does it monitor any of the DL control channels on the dedicated secondary carrier, including the E-AGCH, E-HICH, F-DPCH, and HS-SCCH, unless it is explicitly instructed by the network to do so, e.g., to listen to the HS-SCCH for DL transmissions.

In some embodiments, there is no soft-handover for the dedicated secondary carrier. One consequence is that the CD does not need to perform intra-frequency measurements on neighbour cells and no reporting is needed. Another consequence is that the CD does not need to monitor Relative Grants (RG), which are sent on E-RGCH from neighbour cells in the Active Set on the secondary carrier.

3. Transmission on the Dedicated secondary Carrier

Transmission on the dedicated secondary carrier is granted on an as needed basis. In some embodiments, the CD does not monitor the grant channel for the dedicated secondary carrier until after it transmits data on the primary carrier. The network monitors the needs of the CD at the same time. When a criterion for transmitting on the dedicated secondary carrier is met, the CD is given a time-limited grant (TG) to transmit on the dedicated secondary carrier.

When the CD receives the TG it may begin transmitting user data and control data (e.g., UL DPCCH data) on the dedicated secondary carrier. There may be a specified delay between receipt of the grant and the commencement of transmission so that the CD can perform certain processing. The UL DPCCH on the dedicated secondary carrier may be started at the same time as the user data transmission, however, in some embodiments, no DPCCH preamble is transmitted by the CD before the CD transmits the user data. The initial power at which the CD transmits the user data is determined from the power of the DPCCH of the primary carrier in a way similar to that of the Rel-9 MC HSUPA. The CD then listens to the F-DPCH on the DL of the dedicated secondary carrier for power control commands and the E-HICH for HARQ acknowledgements. It also monitors the HS-SCCH continuously for possible DL transmissions.

When the grant expires, the CD stops all activities on the dedicated secondary carrier. In some embodiments, the secondary DPCCH is also stopped immediately with no postamble transmitted. In other words, continuation of fast power control, a la CPC, between different transmission occasions on the dedicated secondary carrier is not maintained. If the CD still has data to transmit, it may be given another TG on the dedicated secondary carrier. But if there is competition from other users, the network may choose to schedule another CD instead.

The number of users that can be scheduled simultaneously on the dedicated secondary carrier depends on the capability of the network. For example, if the network has more advanced receivers that can cancel the interference from a number of users, more users can be scheduled at the same time. In essence, a dedicated secondary carrier provides a time-shared resource where users can transmit at an arbitrarily high bitrate, limited only by the CD's available power, and does not have to worry about interfering with others.

4. Time-Limited Grants (TGs)

A TG can be realized in different ways. One method is to make use of the existing Absolute Grant (AG) issued from the E-AGCH as specified in the 3GPP 25 series specifications since Release 6 (see. e.g. 3GPP TS 25.321 and related specifications). An AG with the appropriate grant is sent to a user to be scheduled on the dedicated secondary carrier. A second AG with value "ZERO_GRANT" or "INACTVE" can be sent a number of TTIs later to the user to cancel the original grant, hence providing the effect of a time-limited grant. A drawback of this method is the doubled number of grants needed and the more complicated handling on the network side, e.g., to guard against missed detection. If the CD misses a transmission-terminating AG, it will continue to transmit and the transmissions will collide with those from CDs that have just been granted a new AG.

Other methods involve the creation of a new grant channel.

Another method is to reuse the exact Layer 1 structure of the E-AGCH: Since the dedicated secondary carrier is used exclusively for high rates, the number of AGs that may actually be used is quite small. Bits for the grants can therefore be used for the grant duration instead. For example, the 6 bit of the E-AGCH can be split into 1+5, 2+4, or 3+3 for representing grant+duration pairs. With 3 bits for the duration, 8 values can be specified. They can be interpreted as, e.g., 0-7, 1-8, or [0, 1, 2, 4, 8, 16, 32, 64] TTI.

Yet another method is to still model after the E-AGCH but increase the number of bits to provide more value for the grants and/or duration.

A further method is to create a new dedicated control channel similar to the E-RGCH and E-HICH channels. Each user is assigned one of 40 signatures on the channel and is scheduled for 1 TTI (or a fixed predefined number of TTI) on the dedicated secondary carrier upon reception of the assigned signature. Multiple channels may be configured to support more than 40 users.

Methods described above (except for the last) can be extended to include per-HARQ-process grants by using one of the bits for the grant scope.

Finally, the time-limited grant channel, which is to be used for the dedicated secondary carrier, may be configured on either the primary or the dedicated secondary carrier.

5. Scheduling Strategy

A goal is to prevent high-bitrate transmissions from different users from interfering with each other. This is accomplished by utilizing dedicated high-bitrate carriers in a time-shared fashion by limiting the number of users (e.g., to one) that can transmit simultaneously on a carrier. The following method may be used for issuing time-limited grants for dedicated high-bitrate carriers.

A user is scheduled on the primary carrier in the same way as in the normal single carrier case, except that a possibly lower upper limit on the maximum grant is applied. Whether to schedule a user on the dedicated secondary carrier is based on the amount of data the CD has available in its buffer and whether it has sufficient power to transmit at a higher rate. This "scheduling" information is conveyed to the network when the CD has data to send. The CD may be configured to transmit the information periodically or only when certain scheduling criteria are met, e.g. when the amount of data in the buffer and the available CD power for data transmission have exceeded certain specific thresholds.

One realization is to make use of the existing 3GPP "Scheduling Information" (SI), which is an 18-bit MAC PDU transmitted in-band on the E-DCH (see. e.g. 3GPP TS 25.321 and related specifications). The SI conveniently contains the TEBS (total E-DCH buffer status) and the UPH (CD power headroom) already. The SI is needed only when the CD is transmitting data. To avoid increasing the inactive load in both the CD and the network, the SI should not be transmitted when the CD is inactive. The current 3GPP specification does not allow for this distinction, however. That is, the current 3GPP specification requires that an SI is sent when there is data and an SI is therefore always sent when new data arrives. This problem is overcome by introducing, in various embodiments, a new reporting criterion for the SI that is based on data activity: An SI is always triggered at the start of UL scheduled transmission on the primary carrier. Additionally an SI may be triggered only when the TEBS and the UPH have exceeded certain preconfigured thresholds. A repetition time specifies how often the reports are to be transmitted thereafter.

Alternatively a new reporting mechanism that provides more flexibility may be used. The scheduling information reports (SIRs) (applicable also to the SI) are transmitted always on the primary carrier. The new reporting criterion may be included as part of the configuration of the dedicated secondary carrier.

When a CD starts to transmit on the UL, the network monitors the SIR, which may be an SI, to determine if the CD should be given a time-limited grant to transmit on the dedicated secondary carrier and for how long. The network continues to monitor the SIR on the primary carrier to see if the TG should be renewed or if some other users should be scheduled instead. In case of competing demands from different users, the network can perform round-robin scheduling where each user takes turn to transmit for a specific amount of time. Alternatively, the network can allocate more or less time to a user by taking into account user and/or data priority and the distance (in terms of pathloss, for example) a user is from the antenna of the serving cell or the distance to a neighbouring cell.

In addition, the CD may optionally be required to listen for a TG only at specific occasions after the transmission of the data-triggered SIR. This has the benefit of reducing the amount of false detection of TG.

Time-limited grants can be used in both regular CDM scheduling and TDM scheduling that make use of per-HARQ process grants with time-aligned users. In the case of TDM scheduling, users will be given time-limited per-HARQ grants on the dedicated high-bitrate carriers.

6. Allocation of Functionalities to Different Network Elements

The Radio Network Controller (RNC) configures the connection for a CD according to the CD's capabilities, which are transmitted to the network during initial access. For example, the CD may transmit to the RNC configuration information pertaining to the capabilities of the CD. For instance, the configuration information may indicate that the CD has the capability to utilize a dedicated secondary carrier in addition to a primary carrier.

For CDs that are capable of operating with dedicated secondary carriers, the RNC performs the following:
  Configures the CD with a regular carrier as the primary carrier and a dedicated high-bitrate carrier as the dedicated secondary carrier (other CDs are configured on regular carriers only). In some embodiments, the configuring of the CD is accomplished by providing, among other things, control information to the CD, such as configuration information regarding the grant channel via which the network transmits TGs for the dedicated secondary carrier. Such configuration information may include: a DL Channelization code or DL Channelization code and Signature Sequence, depending on the realization of the TG channel. In some embodiments, the control information may also identify a default TG duration.
  Configures the CD with the "scheduling" information reporting as described in 5 above
  Notifies the RBS of the configured primary and dedicated secondary carriers and "scheduling" information reporting criteria.

The RBS performs the following
  Monitors a CD's transmissions on the primary carrier, in particular, the scheduling information reports (SIRs), to understand if the CD can benefit from a TG for transmissions on the dedicated high-bitrate carrier Manage the scheduling of the dedicated secondary carrier: Evaluate the need from all CDs to transmit on the dedicated secondary carrier, including those CDs that are currently given a TG to transmit. Select one or more users for transmissions on dedicated high-bitrate carrier based on certain scheduling strategy (e.g., round-robin, priority-weighted, etc.), determine the duration of the TG and issue the TGs to the selected users.

The CD performs the following:

Scheduling information reporting: Reports buffer status and available power according to the configured reporting mechanism and the report-triggering criteria received from the network.

Reception of TG: The CD monitors the TG grant channel according to the configured condition (e.g., continuous or only during specific instances), receives and discerns any TG addressed to the CD, Transmissions on the dedicated high-bitrate carrier: Upon reception of a TG, start transmitting data on the dedicated high-bitrate carrier for a period specified by the TG and in the manner described in 2 above.

Figure 1:
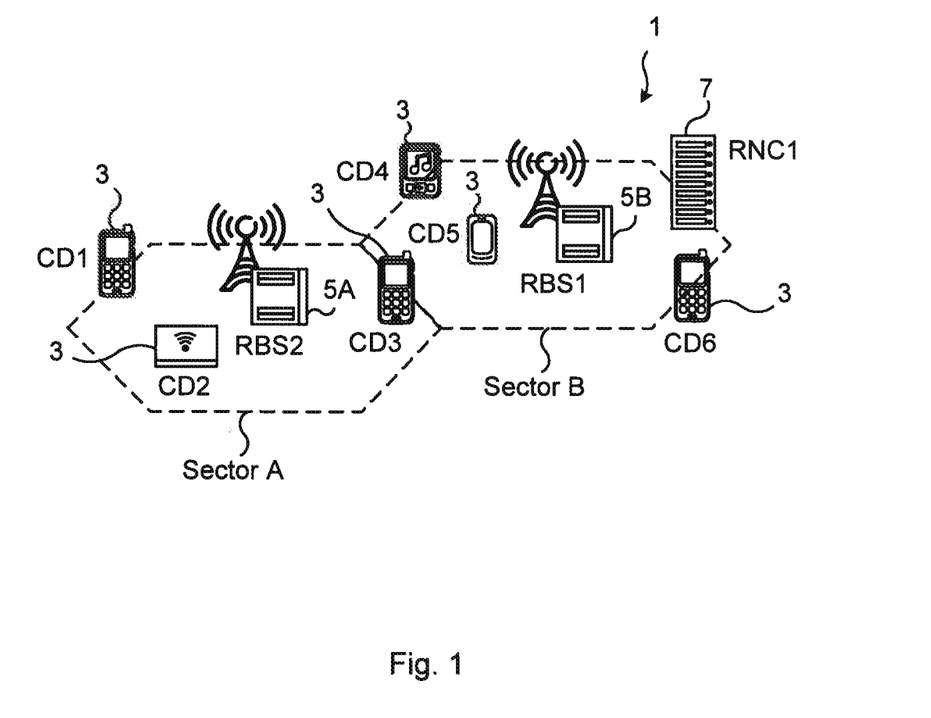
FIG. 1 illustrates a mobile communications network in which the disclosure is applicable.

Referring now to FIG. 1, an example of a mobile communication network 1 is illustrated in which the embodiments described herein may be implemented. The network 1 may for example comprise a UMTS network using W-CDMA as radio access technology. In this example, the network comprises a radio network controller (RNC) 7 supervising a number of radio base stations (RBS) 5A, 5B, for example Node B. As mentioned earlier, the RNC 7 is typically configured to control the RBSs 5A, 5B and for setting up and specifying communication links between the RBSs 5A, 5B and the CDs 3. The network 1 is populated with various types of Communication devices (CDs) 3. Some (e.g., CD5) may be very close to one of the RBSs 5B, some (e.g., CD6) may be rather far away, and some (e.g., CD2 and CD5) can benefit from high-bitrate transmissions.

Figure 2:
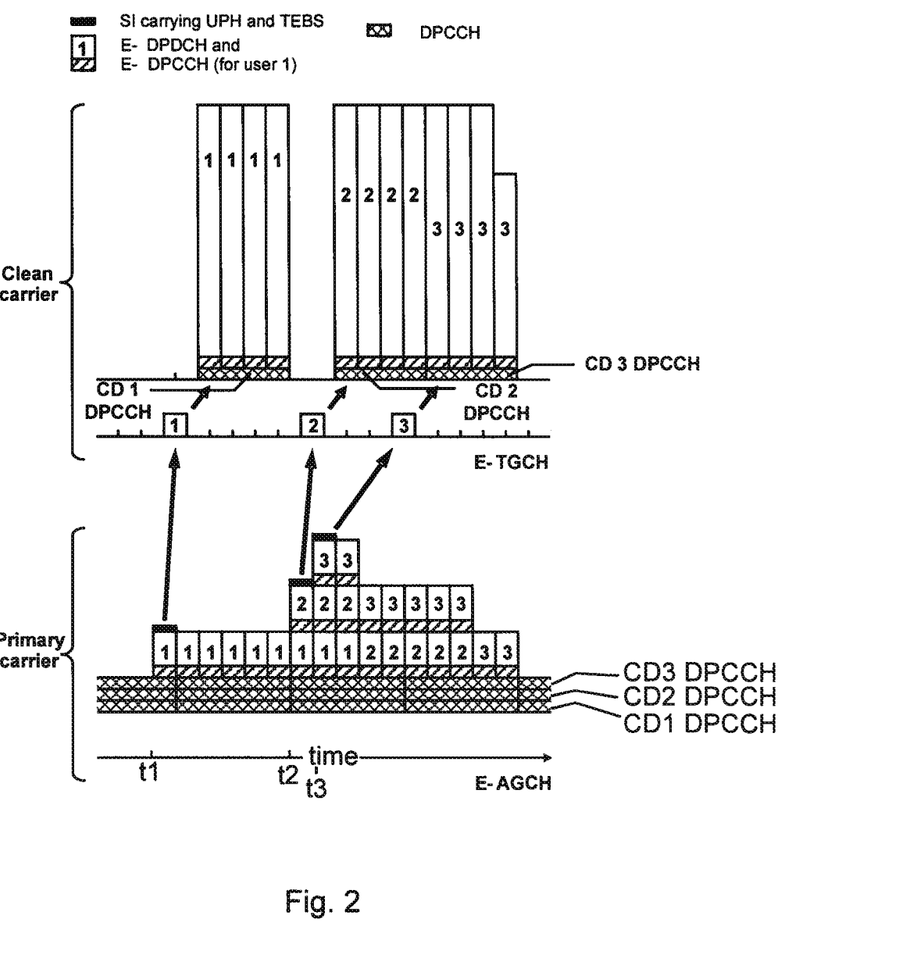
FIG. 2 illustrates three CDs utilizing a secondary carrier.

FIG. 2. is an example illustrating various CDs utilizing the dedicated high-bitrate carrier. More specifically, FIG. 2 shows three different CDs (CD1, CD2 and CD3) communicating with the network 1, illustrating the allocation of transmission occasions on the dedicated high-bitrate carrier. As shown in the lower part of FIG. 2, all the CDs transmit control information more or less on a continuous basis on the DPCCH of the primary carrier. The E-AGCH is the grant channel on the primary carrier on which the CD listens for absolute grants for transmission on the primary carrier. In this example, the E-TGCH (E-DCH Time-Limited Grant Channel) is a grant channel for the dedicated high-bitrate carrier. The CD monitors the E-TGCH for time-limited grants for transmission on the dedicated high-bitrate carrier.

As further shown in FIG. 2, CD 1 transmits data at time t1 using the E-DPDCH of the primary carrier and, at the same time, transmits an SIR (e.g. SI) and control information on the E-DPCCH. As illustrated in FIG. 2, the network 1 (e.g. RBS 5B) responded to this SIR by transmitting a TG to CD1 on the dedicated secondary carrier (upper part of FIG. 2). The SIR that the CD1 transmitted did for example (as described earlier) comprise a buffer status, the size of which triggered the network 1 to transmit the time-limited grant on the dedicated secondary carrier.

In response to receiving the TG, CD1 begins transmitting on the dedicated secondary carrier and continues to transmit until the earlier of: the CD emptying its transmit buffer and the expiration of the TG. Specifically, the CD1 transmits on the dedicated secondary carrier the following during this period: (1) user data using the E-DPDCH for the secondary carrier; (2) control data using the E-DPCCH for the dedicated secondary carrier; and (3) control data using the DPCCH for the dedicated secondary carrier. As shown in FIG. 2, there may be a slight delay between when the CD receives the TG and the CD begins using the dedicated secondary carrier to transmit data towards the network 1.

FIG. 2 shows the same process occurring for CD2 and CD3. That is, FIG. 2 shows that each CD transmits an SIR at the same time the CD begins transmitting user data using the primary carrier, and further shows that, in response to the CD receiving a TG, the CD begins transmitting on the dedicated secondary carrier and continues to transmit until, for example, the expiration of the TG. In particular, in FIG. 2 CD2 transmits data at time t2 on its E-DPDCH and CD3 transmits data at time t3 on its E-DPDCH. As mentioned earlier, the network 1 is configured to evaluate the need from all CDs to transmit on the dedicated high-bitrate carrier, including e.g. CD 1 which is currently given a TG. The scheduling of the CDs CD1, CD2, CD3 may be based on the information provided to the network 1 in the SIR, that is for example buffer status and available CD power being above specific threshold values (e.g. as specified by network operator).

FIG. 2 further shows that the network 1 schedules the dedicated secondary carrier so that, at any given time, at most one, and only one, CD transmits data using the dedicated secondary carrier. Accordingly, in this example, the dedicated secondary carrier is a dedicated high-bitrate carrier.

Figure 3:
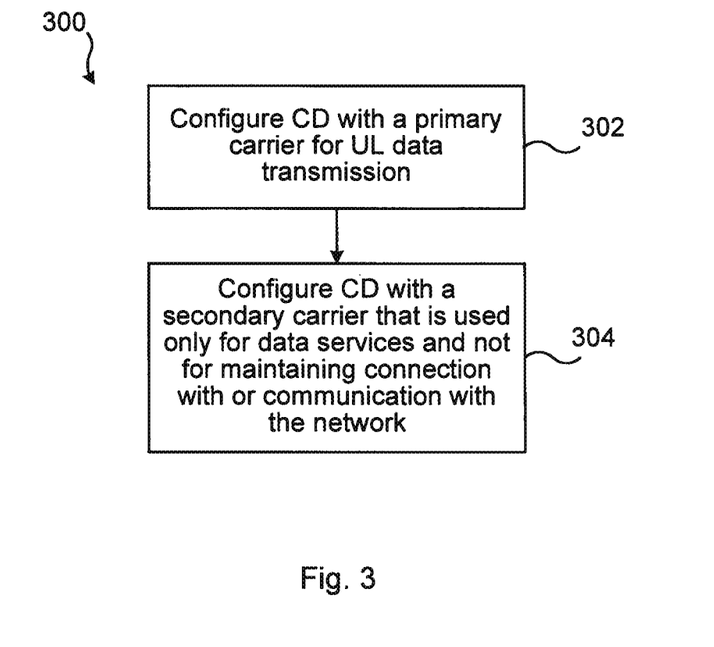
FIG. 3 is a flow chart illustrating a process according to some embodiments.

FIG. 3 illustrates a process 300 according to an embodiment, which process may be performed by a network node (e.g., RNC node 7 or RBS node 5A, 5B). Process 300 may begin with step 302, where the network node configures a CD with a primary carrier for UL data transmission. For example, in step 302, the network node provides to the CD information pertaining to the primary carrier. The network node also configures the CD with a dedicated secondary carrier (e.g. a dedicated high-bitrate carrier) for UL data transmission, which may be a clean carrier (step 304). In some embodiments, the dedicated secondary carrier is used only for data services and not for maintaining connectivity between the CD and the network. In some embodiments, step 304 is accomplished by providing control information to the CD, such as configuration information regarding the grant channel via which the network transmits TGs. Such configuration information may include: a DL Channelization code or DL Channelization code and Signature Sequence, depending on the realization of the TG channel. In some embodiments, the control information may also identify a default TG duration.

Figure 4:
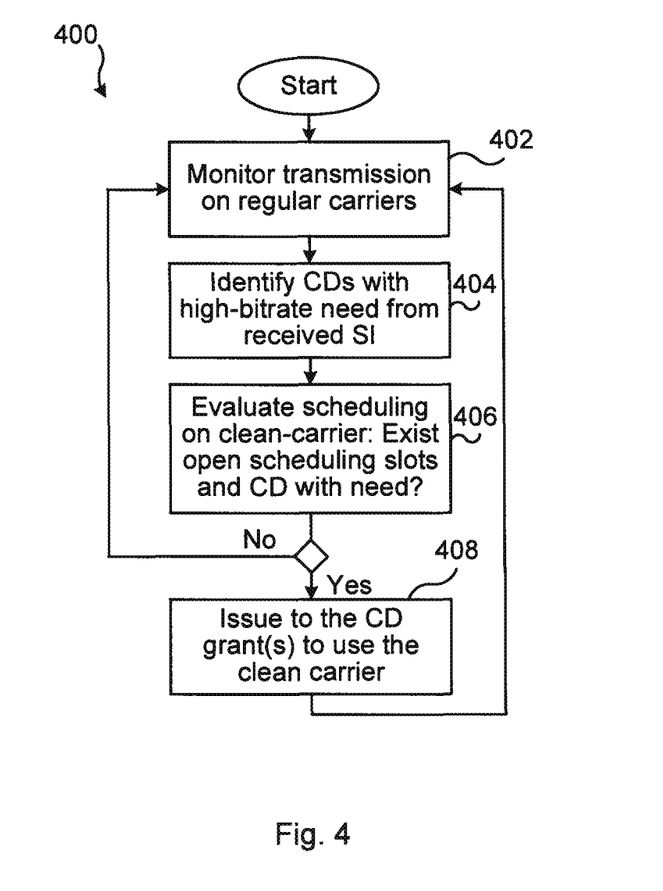
FIG. 4 is a flow chart illustrating a process according to some embodiments.

FIG. 4 illustrates a process 400 according to some embodiments, which process may be performed by a network node (e.g., RBS node 5A, 5B). Process 400 may begin with step 402, where the network node monitors transmissions (e.g. SIRs transmitted by CDs) on the primary carrier, which in some embodiment is a "regular" carrier, as opposed to a "clean" carrier. In step 404, based on the received SIRs, the network node identifies CDs having a need for a high-bitrate carrier. In step 406, in response to identifying a CD having a need for a high-bitrate carrier, the network node determines whether resources are available to allow the CD to transmit UL data using a high-bitrate carrier (e.g., the network node evaluates scheduling on the carrier to determine whether an open scheduling slot exists for the CD and may also evaluate whether the CD has sufficient resources, such as power). In response to determining that resources are available, then in step 408, the network node issues to the CD a TG to use the high-bitrate carrier, which may be a DHBR carrier. If, in step 406, the network node determines that there are no resources available to allow the CD to transmit UL data using a dedicated secondary carrier, the flow may return to step 402, and the network node may continue monitoring transmissions on the primary carrier.

Figure 5:
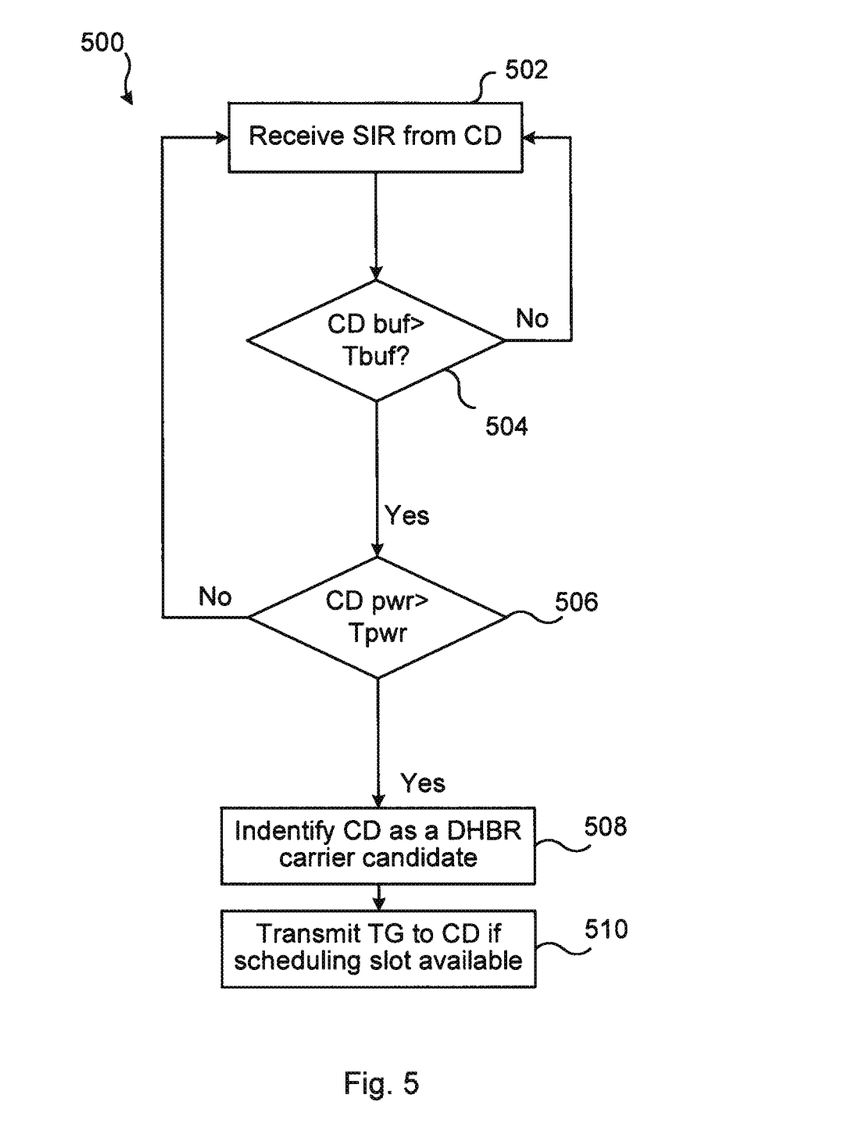
FIG. 5 is a flow chart illustrating a process according to some embodiments.

FIG. 5 illustrates a process 500 according to some embodiments, which process may be performed by a network node (e.g., RBS node 5A, 5B). Process 500 may begin with step 502, where the network node receives an SIR from the CD. This step may be preceded by the network node configuring the CD with a primary carrier for uplink data transmission, on which primary carrier the network node then receives the SIR from the CD. Next (steps 504 and 506) the network node determines (a) whether the amount of data in the CD's transmit buffer (CD buf) meets or exceeds a particular buffer threshold (Tbuf) and (b) whether the CD has sufficient power (e.g. whether the CD's available transmit power (CD pwr) meets or exceeds a particular power threshold (Tpwr)). In response to determining that the CD has sufficient power and the size of the buffer meets or exceeds the threshold level, then the network node identifies the CD as a DHBR carrier candidate CD (step 508). The CD is configured with a secondary dedicated carrier, i.e. the DHBR carrier, and as a result of identifying the CD as DHBR carrier candidate, the network may transmit to the CD a TG. In an embodiment, if either the CD buffer criterion or the CD power criterion is not met, the process stops and starts again when the network node again receives an SIR from the CD. In some embodiments, one of steps 504 and 506 is not performed. That is, in some embodiments, the CD is configured with the dedicated secondary carrier in response to a determination that CD buf >Tbuf, regardless of CD pwr; and in other embodiments the CD is configured with the secondary carrier in response to a determination that CD pwr>Tpwr, regardless of CD buf.

The features described above may be combined in various ways, and below some embodiments are described. A method 500 performed by a network node 5A, 5B, 7 of a network 1 comprising a communication device 3 is provided. The method 500 comprises:
  receiving 502 a scheduling information report from the communication device 3 on a primary carrier,
  determining 504, 506, 508, based on information included in the scheduling information report, whether to provide to the communication device 3 a time-limited grant to use a dedicated secondary carrier, which is separate and distinct from the primary carrier, and
  transmitting 510, based on the determination 504, 506, 508, a time-limited grant to the communication device 3 for transmitting data on the dedicated secondary carrier.

In an embodiment, the determining 504, 506, 508 comprises determining whether the communication device 3 has a need for the dedicated secondary carrier based on one or more of: amount of data in a transmit buffer of the communication device 3 exceeding or meeting a buffer threshold, available transmit power of the communication device 3 meeting or exceeding a power threshold, user priority, and/or data priority.

In an embodiment, the method comprises managing scheduling of the dedicated secondary carrier, the managing comprising evaluating the need from all communication devices 3 in the network 1 and/or availability of scheduling slots on the dedicated secondary carrier and selecting one or more of the communication devices 3 for transmission on the dedicated secondary carrier.

In an embodiment, the method comprises configuring the communication device 3 with the primary carrier and the dedicated secondary carrier for uplink data transmissions to the network node 5A, 5B, 7.

In a variation of the above embodiment, the configuring comprise providing control information to the communication device 3 regarding a grant channel for the dedicated secondary carrier via which the network node 5A, 5B, 7 transmits the time limited grants.

Figure 6:
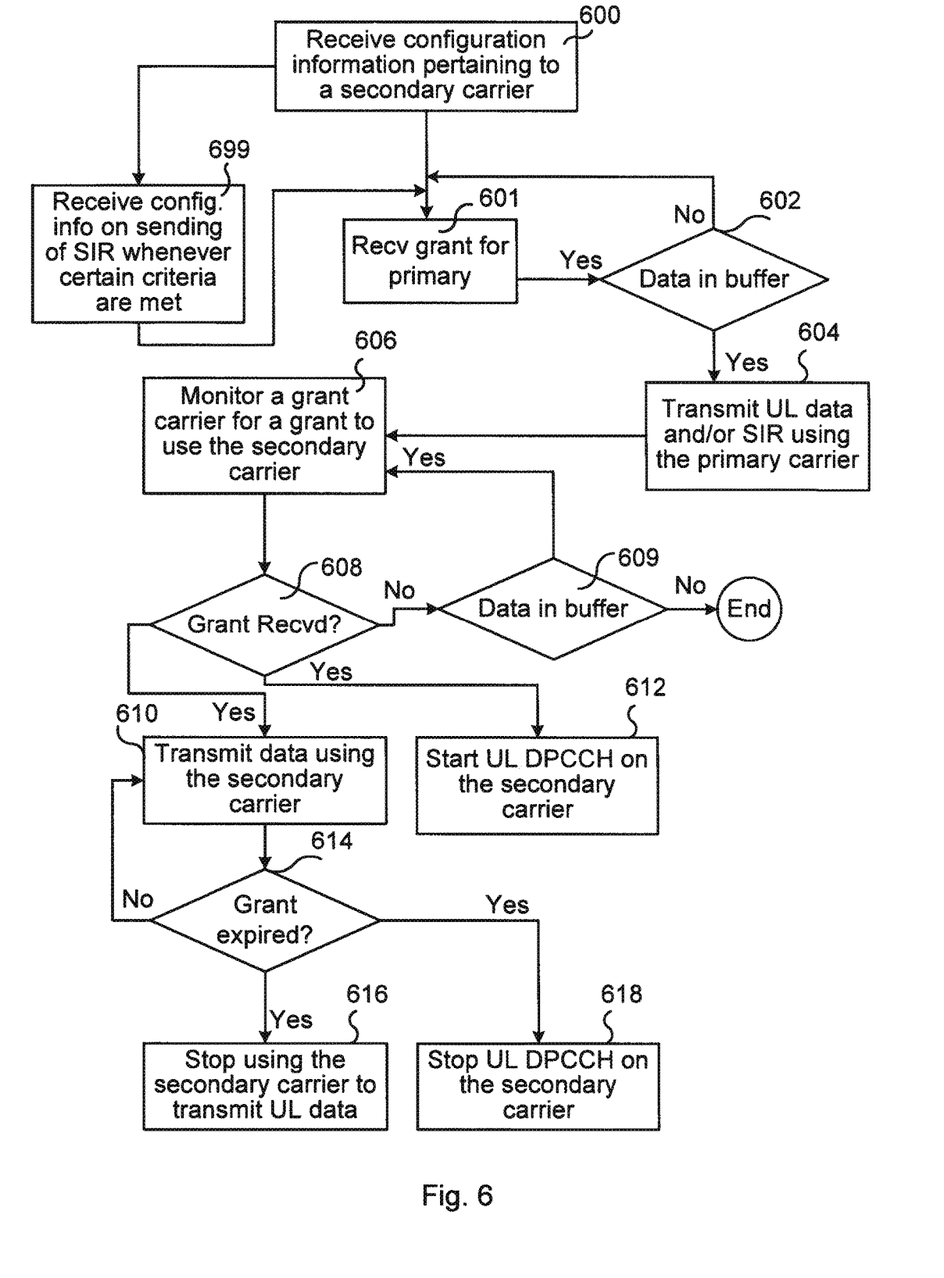
FIG. 6 is a flow chart illustrating a process according to some embodiments.

FIG. 6 illustrates a process according to some embodiments, which process may be performed by a CD. The process may begin with step 600, where the CD receives from the network configuration information pertaining to a dedicated secondary carrier. As described above, this configuration information may include: a DL Channelization code or DL Channelization code and Signature Sequence, depending on the realization of the TG channel. In some embodiments, the control information may also identify a default TG duration. The configuration information may comprise information on sending SI when certain criteria have been met (compare box 699).

In step 601, the CD checks its grant status for the primary carrier. The CD determines whether it has received from the network a grant to use a primary carrier to transmit user data. If so, the process may proceed to step 602. If not, the CD may continue listening on the primary carrier. The CD may also send SI to the network.

In step 602, the CD determines whether there is any user data in its buffer, in particular its transmit buffer. If there is no such user data, the process may go back to step 601, otherwise the process proceeds to step 604.

In step 604, in response to receiving (or following reception of) the grant, the CD uses the primary carrier to transmit to the network user data and the CD may send an SIR at the same time (this feature is also shown in FIG. 2). The SIR may be sent when certain criteria are met, as will be described later. The SIR may contain information regarding (a) the CD's transmit buffer size and (b) the amount of available transmit power for the CD.

Combining the existing legacy rules with these new triggering criteria: in step 604 the CD starts transmitting data if it has a grant for the primary carrier. The CD transmits SI according to legacy rules regardless of whether the CD has a grant or not, but different rules apply (i.e. it transmits according to legacy rules in addition to these new criteria). An SI may or may not be sent as a result. The CD checks if the new SI-triggering criteria are met or not, based on information received in step 699. If the criteria are met and an SI has not been triggered by the legacy rules, the CD transmits an SI.

The CD may thus transmit user data simultaneously with the SIR or send only the SIR depending on whether the CD has a grant for the primary carrier or not; if the CD has no grant, then it sends only the SIR.

As a result of performing step 602, the CD starts monitoring a grant channel (e.g. the grant channel identified in the configuration information received in step 600) for a grant for the CD to use the dedicated secondary carrier (step 606).

In step 608, the CD checks the grant status; there are two cases: 1) the grant has expired/there is no more data in buffer to send or 2) a grant has been received and has not expired. In step 608, the CD determines whether a grant to use the dedicated secondary carrier has been issued.

If such a grant has not been issued to the CD, then the CD determines whether it should continue monitoring the grant channel (step 609). For instance, in some embodiments, the CD may be configured such that that it will stop monitoring the grant channel in response to a determination that the CD's transmit buffer does not include any data. In other embodiments, the CD may also be configured such that it will monitor the grant channel for not more than a predetermined period time after transmitting each SIR.

If in step 608 the CD determines that such a grant has been issued, then the CD transmits UL data using the dedicated secondary carrier and starts an UL DPCCH (steps 610 and 612). Next (e.g. immediately following step 610) the CD determines whether the grant has expired (step 614). In response to determining that the grant has expired, the CD stops using the dedicated secondary carrier and stops the UL DPCCH (steps 616 and 618). That is, if the CD has no data (or no valid grant) it does not send anything. As discussed above, the grant that is received may include (or comprise) information identifying the duration of the grant. In such cases, the CD may activate a timer that will expire after an amount of time equal to the identified grant duration. In this way, when the timer expires, the CD will know that the grant has expired.

As further illustrated in FIG. 6, the CD may, in some embodiments, be configured to send an SIR whenever a certain criterion/criteria is/are met (step 699). For example, the CD may be configured such that it will send an SIR whenever the following two conditions are true: (1) the amount of data in the CD's transmit buffer exceeds a buffer threshold Tbuf and (2) the CD's available transmit power (CD pwr) meets or exceeds a particular power threshold Tpwr. The values Tbuf and Tpwr may be provided to the CD by the RNC node 7. For example, the values Tbuf and Tpwr may be included in the configuration information that the CD receives in step 600.

The features described above may be combined in various ways, and below some embodiments are described. A method performed by a communication device 3 for uplink transmission is provided. The communication device 3 is configured with a primary carrier for uplink data transmission and a dedicated secondary carrier for uplink data transmission to a network node 5A, 5B, 7. The method comprises:
  transmitting 604 a scheduling information report using the primary carrier,
  receiving 608 a grant to use the dedicated secondary carrier, and
  transmitting 610 user data using a data channel on the dedicated secondary carrier upon reception of the grant for the dedicated secondary carrier, wherein the communication device 3 is configured such that it does not transmit any data on the dedicated secondary carrier unless receiving a grant for the dedicated secondary carrier.

In an embodiment, the grant to use the dedicated secondary carrier is a time limited grant.

In a variation of the above embodiment, the method comprises ceasing 616, 618 in response to determining that the grant has expired, use of the dedicated secondary carrier.

In an embodiment, the method comprises, upon transmitting 604 the scheduling information report, monitoring 606 a channel on the primary carrier that is used by the network node to transmit grants for using the dedicated secondary carrier.

In a variation of the above embodiment, the monitoring 606 is performed continuously and/or wherein the monitoring 606 is discontinued upon determination of a transmit buffer of the communication device being empty.

In an embodiment, the method comprises:
  transmitting 612, in response to receiving the grant, data using a control channel on the dedicated secondary carrier,
  determining 614 whether the grant has expired, and
  ceasing 616, 618, in response to determining that the grant has expired, use of the dedicated secondary carrier.

In an embodiment, the dedicated secondary carrier is always on when configured for the communication device 3, the dedicated secondary carrier requiring no activation or deactivation.

In an embodiment, the scheduling information report is sent upon start of an uplink scheduled transmission on the primary carrier and/or when a parameter value for the triggering of the scheduling information report exceeds a preconfigured threshold.

In an embodiment, the dedicated secondary carrier comprises a dedicated high-bitrate carrier that is separate and distinct from the primary carrier.

In an embodiment, the method comprises the communication device 3 transmitting control data on the dedicated secondary carrier only upon receiving a grant for the dedicated secondary carrier.

Figure 7:
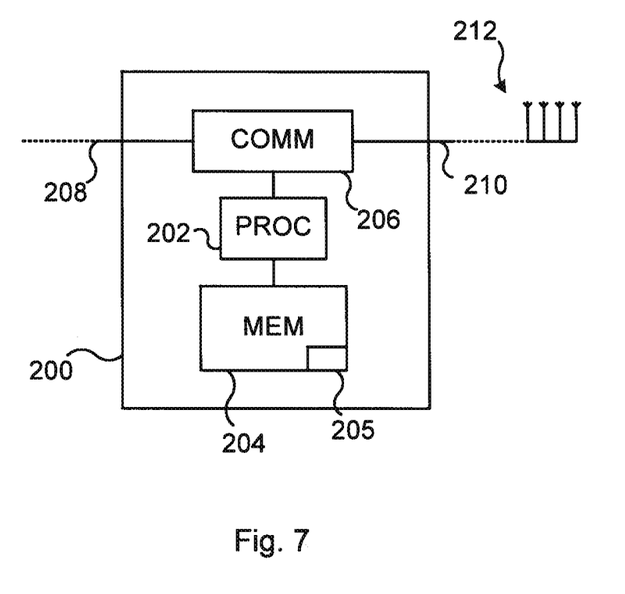
FIG. 7 is a block diagram illustrating a network node according to some embodiments.

FIG. 7 is a functional block diagram that schematically illustrates a network node (e.g., RNC1 (reference numeral 7 of FIG. 1), RBS1 (reference numeral 5B of FIG. 1), RBS2 (reference numeral 5A of FIG. 1)), according to some embodiments. The network node may include processing means, memory means and communication means in the form of a processing device 202 (e.g., one or more of the following: microprocessors, application specific integrated circuits—ASICs, Field-programmable gate arrays (FPGAs), logic circuits, and other circuits), a memory 204 (e.g., non-volatile memory such as hard disk, flash memory or other storage unit) and communication circuitry 206. The network node may communicate with other nodes via a first data path 208 or via a second data path 210. For example, the first data path 208 can be connected to a network and the second data path 210 can connected to one or more antennas 212. The data paths 208, 210 can be any of uplink and downlink data paths, as the skilled person will realize.

A network node 5A, 5B, 7 of a network 1 comprising a communication device 3 is provided configured to perform the various embodiments of the method. In particular, the network node 5A, 5B, 7 may be configured to:
  receive a scheduling information report from the communication device 3 on a primary carrier,
  determine, based on information included in the scheduling information report, whether to provide to the communication device 3 a time-limited grant to use a dedicated secondary carrier, which is separate and distinct from the primary carrier, and
  transmit, based on the determination 504, 506, 508, a time-limited grant to the communication device 3 for transmitting data on the dedicated secondary carrier.

In an embodiment, the network node 5A, 5B, 7 is configured to determine whether the communication device 3 has a need for the dedicated secondary carrier based on one or more of: amount of data in a transmit buffer of the communication device 3 exceeding or meeting a buffer threshold, available transmit power of the communication device 3 meeting or exceeding a power threshold, user priority, and/or data priority.

In an embodiment, the network node 5A, 5B, 7 is configured to manage scheduling of the dedicated secondary carrier, the managing comprising evaluating the need from all communication devices 3 in the network 1 and/or availability of scheduling slots on the dedicated secondary carrier and selecting one or more of the communication devices 3 for transmission on the dedicated secondary carrier.

In an embodiment, the network node 5A, 5B, 7 is configured to configure the communication device 3 with the primary carrier and the dedicated secondary carrier for uplink data transmissions to the network node 5A, 5B, 7.

In a variation of the above embodiment, the network node 5A, 5B, 7 is configured to configure the communication device 3 by providing control information to the communication device 3 regarding a grant channel for the dedicated secondary carrier via which the network node 5A, 5B, 7 transmits the time limited grants.

Figure 8:
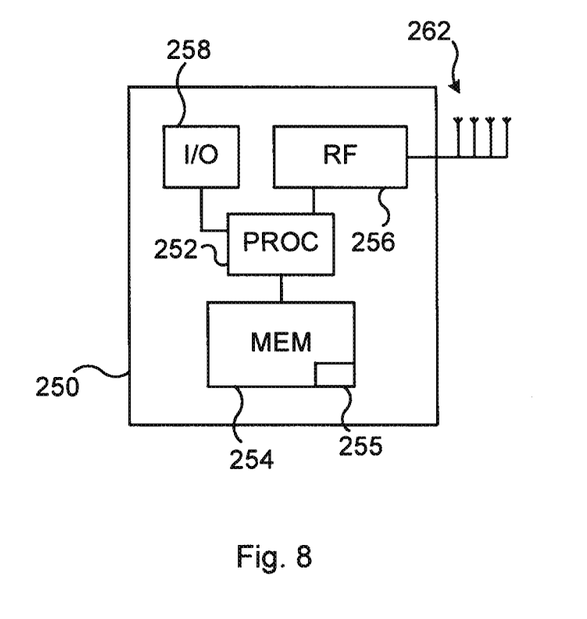
FIG. 8 is a block diagram illustrating a CD according to some embodiments.

FIG. 8 is a functional block diagram that schematically illustrates CD 3, according to some embodiments. The CD may include processing means, memory means and communication means in the form of a processing device 252 (e.g., one or more of the following: microprocessors, application specific integrated circuits—ASICs, Field-programmable gate arrays (FPGAs), logic circuits, and other circuits), a memory 254 (e.g., non-volatile memory such as hard disk, flash memory or other storage unit) and radio circuitry 256. The CD communicates with other nodes via a radio air interface with the use of one or more antennas 262. The CD also comprises input/output circuitry 258 in the form of, e.g., a display, a keypad, a microphone, a camera etc.

A communication device 3 is provided, configured for uplink transmission. The communication device 3 is configured with a primary carrier for uplink data transmission and a dedicated secondary carrier for uplink data transmission to a network node 5A, 5B, 7. The communication device 3 may be configured to perform the various embodiments of the method as described. In particular, the communication device 3 is configured to:

transmit a scheduling information report using the primary carrier, receive a grant to use the dedicated secondary carrier, and transmit user data using a data channel on the dedicated secondary carrier upon reception of the grant for the dedicated secondary carrier, the communication device 3 further being configured such that it does not transmit any data on the dedicated secondary carrier unless receiving a grant for the dedicated secondary carrier.

In an embodiment, the grant to use the dedicated secondary carrier comprises a time limited grant.

In a variation of the above embodiment, the communication device 3 is configured to cease, in response to determining that the grant has expired, use of the dedicated secondary carrier.

In an embodiment, the communication device 3 is configured to, upon transmitting the scheduling information report, monitor a channel on the primary carrier that is used by the network node to transmit grants for using the dedicated secondary carrier.

In a variation of the above embodiment, the communication device 3 is configured to perform the monitoring continuously and/or configured to discontinue the monitoring upon determination of a transmit buffer of the communication device 3 being empty.

In an embodiment, the communication device 3 is configured to:

transmit, in response to receiving the grant, data using a control channel on the dedicated secondary carrier, determine whether the grant has expired, and cease, in response to determining that the grant has expired, use of the dedicated secondary carrier.

In an embodiment, the dedicated secondary carrier is always on when configured for the communication device 3, requiring no activation or deactivation.

In an embodiment, the dedicated secondary carrier comprises a dedicated high-bitrate carrier that is separate and distinct from the primary carrier.

In an embodiment, the communication device 3 is configured to transmit control data on the dedicated secondary carrier only upon receiving a grant for the dedicated secondary carrier.

The methods described herein can be implemented in the network nodes and the CD, described herein, respectively. In such embodiments, the method actions are realized by means of software instructions 205, 255 that are stored in the memory 204, 254 and are executable by the processor 202, 252. Such software instructions 205, 255 can be realized and provided in any suitable way, e.g. installed during manufacturing, as the skilled person will realize. Moreover, the memory 204, 254, the processor 202, 252, as well as the communication circuitry 206 and radio circuitry 256 comprise software and/or firmware that, in addition to being configured such that it is capable of implementing the methods to be described, is configured to control the general operation of the network node and the CD, respectively, when operating in a cellular mobile communication system such as the system 1 in FIG. 1. However, for the purpose of avoiding unnecessary detail, no further description will be made in the present disclosure regarding this general operation.

Advantages

Today's mobile networks are dominated by smart-phone traffic which tends to be rather bursty in nature. It is both to the users' and to the network's advantage to enable short high-bitrate bursts. Embodiments of this disclosure may provide the following benefits:

Reduced latency.

Very high bitrate for bursty traffic in a many-user, mixed-traffic environment.

No impact on CD battery consumption from enabling the high-bitrate transmissions. In fact, CD battery consumption may be reduced due to shorter transmission time.

Simplified network handling of user traffic and the interference environment.

Increased capacity for smartphone traffic.

Additionally, the following advantages may be realized in some embodiments:

The methods do not require allocating certain system-internal resources in addition to radio resources and are thus less expensive in terms of network processing load;

The methods do not require significant RRC signaling, in particular compared to prior art methods, and thus avoid introducing significant delay on the order of hundreds of milliseconds caused by the RRC signaling. Thus, if the CD requires only a few TTI of high-bitrate transmissions, it may still be worth the effort to provide a TG to the CD.

Starting of low-rate services, e.g., speech, while a CD is transmitting on a dedicated high-bitrate carrier do not require that the connection be reconfigured back to a regular carrier.

There is no delay in activating and deactivating the dedicated secondary carrier because it does not require activation or deactivation.

There is no overhead for the dedicated secondary carrier for standby purpose: For inactive users, there is no cost in terms of higher CD battery consumption. The UL DPCCH is not transmitted on the dedicated secondary carrier for maintaining synchronization and power control. The CD also does not need additional monitoring of the DL control channels on the dedicated secondary carrier for UL purpose.

For the network, the interference that would otherwise be realized from DPCCH transmission from inactive CD, which consumes considerable capacity of the secondary carrier and could be severe, is not present. Because the interference is not present, CD's can transmit on the dedicated secondary carrier using less power.

Maintaining mobility on the secondary carrier: The CD is not required to perform intra-frequency measurement and is not required to report intra-frequency events to the network.

As described above, this disclosure describes:

Embodiment 1. A method performed by a communication device (CD). The method comprising:

(a) transmitting a scheduling information report (SIR) using a primary carrier;

(b) after step (a), receiving a grant to use a dedicated high-bitrate (DHBR) carrier that is separate and distinct from the primary carrier; and (c) in response to receiving the grant, transmitting user data using a data channel on the DHBR carrier, wherein the CD is configured such that it does not transmit any data on the DHBR carrier unless it receives a grant for the DHBR carrier.

The method of embodiment 1, wherein the grant is a time limited grant.

The method of embodiment 1, wherein the step of transmitting an SIR consists of transmitting SI.

The method of embodiment 1, wherein in response to receiving the grant, the CD further transmits control data using a control channel on the DHBR channel, the method further comprises, after step (c), determining whether the grant has expired; and the method further comprises ceasing use of the DHBR carrier to transmit data in response to determining that the grant has expired.

Embodiment 2. A communication device comprising:

means for transmitting scheduling information reports (SIRs) using a primary carrier;

means for receiving a grant to use a dedicated high-bitrate (DHBR) carrier that is separate and distinct from the primary carrier; and means for transmitting user data using a data channel on the DHBR carrier in response to receiving the grant, wherein the communication device is configured such that it does not transmit any data on the DHBR carrier unless it receives a grant for the DHBR carrier.

Embodiment 3. A communication device (CD), wherein:

the CD is operable to use a primary carrier and a dedicated secondary carrier to transmit UL data;

the CD is configured to transmit an SIR using the primary carrier;

the CD is configured such that, the CD monitors a channel that is used by a network node to transmit grants for using the dedicated secondary carrier;

the CD is configured such that the CD does not transmit substantially any control or UL data using the dedicated secondary data without first receiving a grant for using the dedicated secondary carrier;

the CD is configured such that, in response to receiving a grant for using the dedicated secondary carrier, the CD transmits data using the dedicated secondary carrier.

Embodiment 4. A communication device comprising:

means for using a primary carrier and a dedicated secondary carrier to transmit UL data;

means for transmitting scheduling information reports (SIRs) using the primary carrier; and means for monitoring a channel that is used by a network node to transmit grants for using the dedicated secondary carrier, wherein the communication device is configured such that the communication device does not transmit substantially any control or user data using the dedicated secondary data without first receiving a grant for using the dedicated secondary carrier, and the communication device is configured such that, in response to receiving a grant for using the dedicated secondary carrier, the communication device transmits data using the dedicated secondary carrier.

Embodiment 5. A communication device (CD) configured to:

(a) transmit a report using a primary carrier;

(b) after step (a), receive a time-limited grant (TG) to use a dedicated high-bitrate (DHBR) carrier that is separate and distinct from the primary carrier;

(c) in response to receiving the TG, transmit uplink data using the DHBR carrier;

(d) after step (c), determine whether the TG has expired; and (e) in response to determining that the TG has expired, cease all use of the DHBR carrier.

Embodiment 6. A method performed by a network node, comprising:

receiving an SIR transmitted from the CD using a primary carrier;

based on information included in the SIR (as well as possibly other criteria such as user priority, data priority, and/or availability of scheduling slots on the DHBR carrier), determining whether to provide to the CD a time-limited grant (TG) to use the DHBR carrier, which is separate and distinct from the primary carrier; and providing the TG to the CD.

Embodiment 7. A network node configured to:

receive a report transmitted from the CD using a primary carrier;

based on information included in the report, determine whether to provide to the CD a time-limited grant (TG) to use a dedicated high-bitrate carrier that is separate and distinct from the primary carrier; and provide the TG to the CD.

Embodiment 8. A method performed by a communication device, comprising:

transmitting data using a primary carrier;

as a result of transmitting the data using the primary carrier, listening for a grant to use a dedicated secondary carrier.

The method of embodiment 8, wherein the data comprises scheduling information (SI).

Embodiment 9. A method performed by a communication device, comprising:

transmitting data using a primary carrier, the data including control data and user data;

transmitting data using a dedicated secondary carrier only after receiving a grant to use the dedicated secondary channel such that no data is transmitted by the communication device using the dedicated secondary carrier prior to receipt of a grant to use the dedicated secondary carrier.

Thus, the communication device may implement a method wherein it performs a transmission using a primary carrier, the transmission including control information and user data, and performing a transmission using a dedicated secondary carrier, the transmission including data, and wherein this transmission is made only after it has received a grant to use the dedicated secondary channel. No data is transmitted by the communication device using the dedicated secondary carrier prior to receipt of a grant to use it.

Embodiment 10. A method performed by a communication device (CD).
The method includes:
receiving a grant from a network node;
in response to receiving the grant, transmitting user data to the network; and
transmitting an SIR as a result of transmitting the user data.

The method of Embodiment 10 wherein the SIR is transmitted at the same time as (or substantially the same time as) the user data.

The method of Embodiment 10 wherein the CD is configured such that it only transmits SIRs together with user data.

The method of Embodiment 10 wherein the CD is configured such that in direct response to transmitting the SIR, the CD begins monitoring a grant channel that the network uses to transmit grants to use a dedicated secondary carrier.

The method of Embodiment 10 wherein the CD monitors the grant channel only during data transmissions.

The method of Embodiment 10 wherein the CD monitors the grant channel only during certain specified occasions to cut down on false detections.

Embodiment 11. A method performed by a communication device (CD). The method includes:
transmitting user data on a primary carrier; and
in direct response to transmitting the user data, monitoring a DL channel on a dedicated secondary carrier.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a user equipment (UE) for uplink transmission, the UE being configured with a primary carrier for uplink data transmission and a dedicated secondary carrier for uplink data transmission to a network node, the method comprising:
the UE transmitting a scheduling information report using the primary carrier,
the UE receiving a time limited grant to use the dedicated secondary carrier,
the UE receiving control information regarding a grant channel for the dedicated secondary carrier via which the network node transmits the time limited grants, and
the UE transmitting user data using a data channel on the dedicated secondary carrier upon reception of the grant for the dedicated secondary carrier, wherein the UE is configured such that it does not transmit any data on the dedicated secondary carrier unless receiving a grant for the dedicated secondary carrier.

2. The method as claimed in claim 1, comprising ceasing, in response to determining that the grant has expired, use of the dedicated secondary carrier.

3. The method as claimed in claim 1, comprising, upon transmitting the scheduling information report, monitoring a channel on the primary carrier that is used by the network node to transmit grants for using the dedicated secondary carrier.

4. The method as claimed in claim 3, wherein the monitoring is performed continuously and/or wherein the monitoring is discontinued upon determination of a transmit buffer of the UE being empty.

5. The method as claimed in claim 1, wherein the dedicated secondary carrier is always on when configured for the UE, the dedicated secondary carrier requiring no activation or deactivation.

6. The method as claimed in claim 1, wherein the scheduling information report is sent upon start of an uplink scheduled transmission on the primary carrier and/or when a parameter value for the triggering of the scheduling information report exceeds a preconfigured threshold.

7. The method as claimed in claim 1, wherein the dedicated secondary carrier comprises a dedicated high-bitrate carrier that is separate and distinct from the primary carrier.

8. The method as claimed in claim 1, comprising the UE transmitting control data on the dedicated secondary carrier only upon receiving a grant for the dedicated secondary carrier.

9. The method as claimed in claim 1, comprising:
transmitting, in response to receiving the grant, data using a control channel on the dedicated secondary carrier.

10. The method as claimed in claim 1, further comprising:
determining whether the grant has expired, and
ceasing, in response to determining that the grant has expired, use of the dedicated secondary carrier.

11. The method of claim 1, wherein the UE transmits the scheduling information report to the network node in response to determining that an amount of data buffered at the UE exceeds a predetermined threshold.

12. The method as claimed in claim 1, comprising:
transmitting, in response to receiving the grant, data using a control channel on the dedicated secondary carrier.

13. A method preformed by a user equipment (UE) for uplink transmission, the UE being configured with a primary carrier for uplink data transmission and a dedicated secondary carrier for uplink data transmission to a network node, the method comprising:
the UE transmitting a scheduling information report using the primary carrier,
the UE receiving a grant to use the dedicated secondary carrier,
the UE transmitting user data using a data channel on the dedicated secondary carrier upon reception of the grant for the dedicated secondary carrier, wherein the UE is configured such that it does not transmit any data on the dedicated secondary carrier unless receiving a grant for the dedicated secondary carrier,
the UE transmitting, in response to receiving the grant, data using a control channel on the dedicated secondary carrier,
determining whether the grant has expired, and
ceasing, in response to determining that the grant has expired, use of the dedicated secondary carrier.

14. A user equipment (UE) configured for uplink transmission, the UE being configured with a primary carrier for uplink data transmission and a dedicated secondary carrier for uplink data transmission to a network node, the UE being configured to:
- transmit a scheduling information report using the primary carrier,
- receive a time limited grant to use the dedicated secondary carrier,
- receive control information regarding a data channel for the dedicated secondary carrier via which the network node transmits the time limited grants, and
- transmit user data using a data channel on the dedicated secondary carrier upon reception of the grant for the dedicated secondary carrier, the UE further being configured such that it does not transmit any data on the dedicated secondary carrier unless receiving a grant for the dedicated secondary carrier.

15. The UE as claimed in claim 14, configured to cease, in response to determining that the grant has expired, use of the dedicated secondary carrier.

16. The UE as claimed in claim 14, configured to, upon transmitting the scheduling information report, monitor a channel on the primary carrier that is used by the network node to transmit grants for using the dedicated secondary carrier.

17. The UE as claimed in claim 16, wherein the UE is configured to perform the monitoring continuously and/or configured to discontinue the monitoring upon determination of a transmit buffer of the UE being empty.

18. The UE as claimed in claim 14, wherein the dedicated secondary carrier is always on when configured for the UE, requiring no activation or deactivation.

19. The UE as claimed in claim 14, wherein the dedicated secondary carrier comprises a dedicated high-bitrate carrier that is separate and distinct from the primary carrier.

20. The UE as claimed in claim 14, wherein the UE is configured to transmit control data on the dedicated secondary carrier only upon receiving a grant for the dedicated secondary carrier.

21. A user equipment (UE) configured for uplink transmission, the UE being configured with a primary carrier for uplink data transmission and a dedicated secondary carrier for uplink data transmission to a network node, the UE being configured to:
- transmit a scheduling information report using the primary carrier,
- receive a grant to use the dedicated secondary carrier,
- transmit user data using a data channel on the dedicated secondary carrier upon reception of the grant for the dedicated secondary carrier, the UE further being configured such that it does not transmit any data on the dedicated secondary carrier unless receiving a grant for the dedicated secondary carrier,
- transmit, in response to receiving the grant, data using a control channel on the dedicated secondary carrier,
- determine whether the grant has expired, and
- cease, in response to determining that the grant has expired, use of the dedicated secondary carrier.

22. A method performed by a network node of a network comprising a user equipment (UE), the method comprising:
- receiving a scheduling information report from the UE on a primary carrier,
- determining, based on information included in the scheduling information report, whether to provide to the UE a time-limited grant to use a dedicated secondary carrier, which is separate and distinct from the primary carrier,
- transmitting, based on the determination, a time-limited grant to the UE for transmitting data on the dedicated secondary carrier, and
- transmitting control information regarding a grant channel for the dedicated secondary carrier via which the network node transmits the time limited grants.

23. The method as claimed in claim 22, wherein the determining comprises determining whether the UE has a need for the dedicated secondary carrier based on one or more of: amount of data in a transmit buffer of the UE exceeding or meeting a buffer threshold, available transmit power of the UE meeting or exceeding a power threshold, user priority, and/or data priority.

24. The method as claimed in claim 22, comprising managing scheduling of the dedicated secondary carrier, the managing comprising evaluating the need from all UEs in the network and/or availability of scheduling slots on the dedicated secondary carrier and selecting one or more of the UEs for transmission on the dedicated secondary carrier.

25. The method as claimed in claim 22, comprising configuring the UE with the primary carrier and the dedicated secondary carrier for uplink data transmissions to the network node with the control information.

26. A network node of a network comprising a user equipment (UE), the network node being configured to:
- receive a scheduling information report from the UE on a primary carrier,
- determine, based on information included in the scheduling information report, whether to provide to the UE a time-limited grant to use a dedicated secondary carrier, which is separate and distinct from the primary carrier,
- transmit, based on the determination, a time-limited grant to the UE for transmitting data on the dedicated secondary carrier, and
- transmit control information regarding a grant channel for the dedicated secondary carrier via which the network node transmits the time limited grants.

27. The network node as claimed in claim 26, wherein the network node is configured to determine whether the UE has a need for the dedicated secondary carrier based on one or more of: amount of data in a transmit buffer of the UE exceeding or meeting a buffer threshold, available transmit power of the UE meeting or exceeding a power threshold, user priority, and/or data priority.

28. The network node as claimed in claim 26, wherein the network node is configured to manage scheduling of the dedicated secondary carrier, the managing comprising evaluating the need from all UEs in the network and/or availability of scheduling slots on the dedicated secondary carrier, and selecting one or more of the UEs for transmission on the dedicated secondary carrier.

29. The network node as claimed in claim 26, configured to configure the UE with the primary carrier and the dedicated secondary carrier for uplink data transmissions to the network node with the control information.

* * * * *

UNITED STATES PATENT AND TRADEMARK OFFICE
CERTIFICATE OF CORRECTION

PATENT NO. : 9,608,783 B2  Page 1 of 1
APPLICATION NO. : 14/131980
DATED : March 28, 2017
INVENTOR(S) : Kwong et al.

It is certified that error appears in the above-identified patent and that said Letters Patent is hereby corrected as shown below:

In the Specification

In Column 2, Lines 12-14, delete "CD transmits data only on the primary carrier. When there is the need, the CD can be scheduled to transmit on the secondary carrier in addition to the primary carrier." and insert the same after "need, the", Line 11, as a continuation paragraph.

In Column 14, Line 39, delete "can connected" and insert -- can be connected --, therefor.

In the Claims

In Column 20, Line 45, in Claim 13, delete "preformed" and insert -- performed --, therefor.

Signed and Sealed this
Twenty-ninth Day of September, 2020

Andrei Iancu
*Director of the United States Patent and Trademark Office*